Patented Jan. 30, 1940

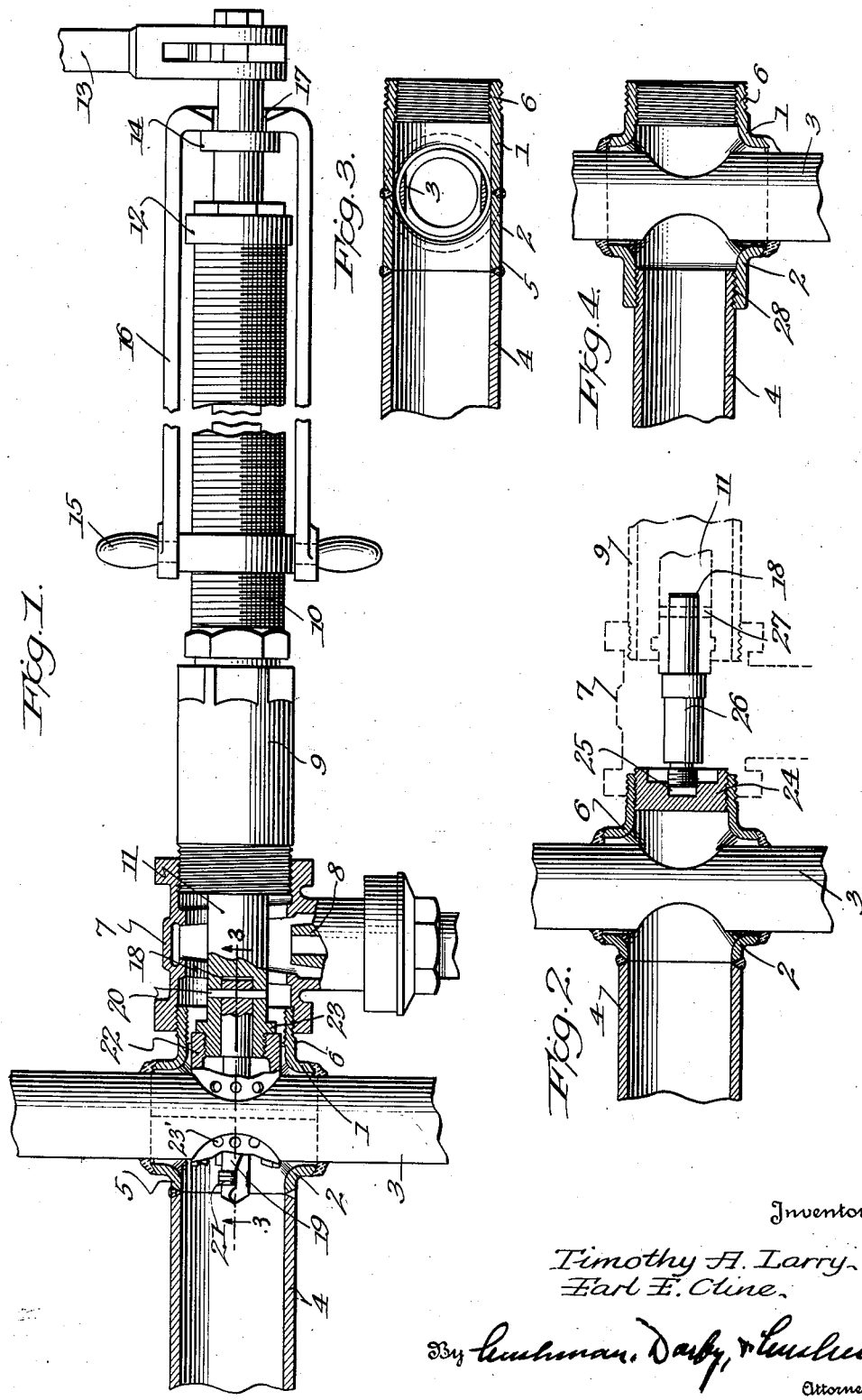

2,188,607

UNITED STATES PATENT OFFICE 2,188,607

METHOD OF MAKING LATERAL EXTENSIONS FROM PIPE LINES

Timothy A. Larry and Earl E. Cline, Decatur, Ill., assignors to Mueller Co., Decatur, Ill., a corporation of Illinois Application November 16, 1936, Serial No. 111,164

2 Claims. (Cl. 77—37)

This invention relates to apparatus and methods for making a lateral extension from a conduit.

In the maintenance and extensions of pipe line systems, it is frequently necessary to attach a branch line to a main line, and it is highly desirable that this be done without substantial loss of fluid or fluid pressure in order that there will be no interruption of service to consumers whose service pipes connect with the main conduit.

Where the pipe line contains a fluid which is under high pressure or where the fluid is of such nature as to be harmful to workers, it is especially desirable that extensions be made without substantial loss of fluid.

The present invention makes possible the extension of existing pipe lines in an economical and convenient manner and with the use of relatively inexpensive apparatus.

Further objects of the invention will be apparent from the accompanying description and drawing.

Referring to the drawing,

Figure 1 is a plan view showing a branch line attached to a main line with the drilling apparatus in place.

Figure 2 is a plan view of the branch line attached to a main line showing the application of a closure to the opening through which the drill was inserted.

Figure 3 is a section taken on the line 3—3 of Figure 1, omitting the valve body and drilling apparatus.

Figure 4 is a plan view showing a modification of the apparatus used in carrying out the invention.

In carrying out the present invention, a fitting having two pairs of aligned openings, and referred to herein as a cross, is preferably divided into two parts 1 and 2 along the axis of one pair of aligned openings. The two parts 1 and 2 are then brought together around the conduit 3, to which an extension is to be connected, and are preferably welded together along their opposed edges, and welded to the conduit 3, as shown in the drawing.

A branch conduit 4 is then secured, preferably by a butt weld as shown in Figure 1, to the hub 5 extending from the part 2 at right angles to the main conduit 3. The hub 6 extending in the opposite direction from the part 1, at right angles to the conduit 3, is preferably screw threaded exteriorly for the attachment of a valve body 7 provided with a gate valve 8.

An adapter sleeve 9 is threaded into the upper end of the valve body 7, as shown in Figure 1, and a device or machine, generally similar to pipe drilling machines of well-known construction and including a feed sleeve 10, is threaded on the upper end of the adapter sleeve 9. A bar 11 is slidably and rotatably mounted within the feed sleeve 10, a fluid tight joint being maintained between the two by means of conventional packing (not shown) secured upon the upper end of the feed sleeve 10 by an internally flanged collar 12. The bar 11 is provided at its upper end with an operating handle 13 having a conventional double ratchet device thereon to permit the device to be rotated in either direction with a ratchet effect. A collar 14 is fixed on the upper portion of the bar 11 beneath the handle 13 and, in order that the bar 11 may be fed downwardly in the usual manner, a feed screw 15 is threaded upon the feed sleeve 10 and may be connected to the bar 11 by means of a yoke 16 pivoted upon the feed screw and having its head portion slotted as at 17 so that it may be moved into engagement with the upper surface of the collar 14 as shown in Figure 1.

The lower end of the bar 11 is provided with a central bore 18 for the reception of a pilot drill 19, which is retained therein by means of a pin 20 passing through suitable apertures in the bar and pilot drill. The lower end of the pilot drill is enlarged to provide a shoulder 21 thereon.

The lower end of the bar 11 is externally threaded for engagement with the internal threads of a shell cutter 22, and is provided with a flange 23, positioned above the screw threads, against which the upper end of the shell cutter abuts when the latter is tightly screwed on to the bar. The shell cutter 22 is preferably provided with a plurality of apertures 23' so that when the shell cutter passes through the conduit 3 there will be no interruption of the flow of fluid.

The branch conduit 4 having been joined to the hub 5, and the valve body 7 with the above described drilling apparatus having been connected to the hub 6, the bar 11 is moved inwardly, with the gate valve 8 open, until the pilot drill 19 engages the conduit 3. The yoke 16 is then swung into engagement with the bar 11, its slotted head portion positioned above the collar 14 of the bar, and drilling is accomplished by rotating the bar 11 by means of the handle 13 and applying downward pressure by rotating the feed screw 15 to the right.

It will be understood that the pilot drill precedes the shell cutter through the pipe and acts as a guide for the shell cutter. The coupons, which are cut out of the pipe by the shell cutter, will be caught on the shoulder 21 at the lower end of the pilot drill 19 and will therefore be removed when the drill is withdrawn.

Owing to the fact that the drilling device is completely enclosed, no fluid will escape during the drilling operation.

When the drilling is completed, the yoke 16 is disengaged from the bar 11 and the latter is then moved outwardly to withdraw the shell cutter and pilot drill into the adapter 9. The gate valve 8 is then operated to closed position and the drilling apparatus is removed by unscrewing the adapter 9 from the valve body 7.

Since, during the drilling operation, the shell cutter passes entirely through the main conduit 3 in a direction which is axial with respect to the branch conduit 4, it will be seen that communication is thereby established between the two conduits.

If desired, valve body 7 may be left secured to the hub 6 and, if a lateral extension is desired at the same point but in the opposite direction, a branch conduit may be secured to the outer end of the valve body and the gate valve 8 may be operated to open position.

However, where only one branch conduit is needed, the opening through the hub 6 of the cross may be plugged and the valve body 7 may be removed without loss of fluid or fluid pressure in the following manner.

In carrying out the method of applying an inexpensive closure to the opening through the hub 6, certain parts of the drilling apparatus described above and shown in Figure 1, including the adapter 9 and bar 11 are utilized, together with the valve body 7, gate valve 8, and a closure applying tool which is to be described below.

The shell cutter 22 is unscrewed and detached from the bar 11 and the pilot drill is detached by removing the pin 20.

Referring to Figure 2, the closure preferably comprises a plug like member 24 having external right-hand threads adapted to engage internal threads in the hub 6. An internally threaded bore 25, of appreciably less depth than the thickness of the plug, is provided for the reception of the closure applying tool.

The closure applying tool, shown in Figure 2, comprises a cylindrical member 26, the lower end of which is provided with right-hand threads which are adapted to engage the internal threads of the bore 25 in the closure 24. The other end of the member 26 is adapted to extend into the bore 18 in the lower end of the bar 11 and may be secured therein by means of a pin 27.

The method of inserting the closure comprises attaching an applying tool to a closure 24 by screwing the threaded end of the tool into the bore 25 thereof and securing the other end of the tool to the bore 18 of the bar 11. Adapter 9 is then screwed into valve body 7, the bar 11 with the closure 24 attached thereto having been first moved to its outermost position. The gate valve 8 is then withdrawn and the closure is moved into contact with the hub 6 by moving the bar 11 inwardly. The handle 13 of the bar 11 is then rotated to the right to screw the closure tightly into the opening within the hub 6.

After the closure has been tightened, the bar 11 may be turned to the left and the inserting tool 26 unscrewed from the closure 24. The closure will not be disengaged from the hub 6, when the bar 11 is rotated to the left, by reason of the fact that the diameter of the lower threaded end of tool 26 is considerably less than the diameter of the closure 24. Since the lower threaded end of the tool presents the smaller threaded area, the friction tending to prevent its disengagement will be less than the friction at the external threads of the closure.

The opening through the hub 6 having been thus sealed, without substantial loss of fluid, by the insertion of the plug 24, and the inserting tool having been removed, the valve body 7, together with the adapter 9 and bar 11, may be removed from the hub. If desired, a cap (not shown), internally threaded for engagement with the external threads of the hub 6, may then be screwed on to the upper end of the hub over the closure 24.

It will be understood that the apparatus, above described, may be modified without departing from the scope of the invention. For example, the branch conduit may be threaded to the cross, as shown in Figure 4, internal threads 28 being provided in the hub 5 for this purpose.

Although it is customary to cast the cross in one piece and subsequently divide it into two parts as, above described, it may be desirable to cast the two parts separately and it may also be convenient to make the two parts identical.

The diameter of the shell cutter 22 may be slightly greater than the internal diameter of the main conduit, as shown in the drawing, but it will be understood that it may be substantially smaller or it may be greater than the outside diameter of the conduit. It has been found that when the entire cross section of the main conduit is cut out, the conduit is not substantially weakened where the cross is welded to it as herein described.

The above described methods, as well as the apparatus, may be modified within the purview of the invention and it is intended that all matter contained in the above description or shown in the accompanying drawing shall be regarded as merely illustrative.

I claim:

1. The method of making a lateral extension from a conduit which comprises forming a cross about the conduit, the conduit extending through two aligned openings of the cross, securing a second conduit and an enclosed drilling apparatus respectively to the other aligned openings of the cross and drilling through the conduit in a direction which is substantially axial with respect to the second conduit thereby establishing communication between the two conduits and closing the opening of the cross which is opposite to the second conduit.

2. The method of making a lateral extension from a conduit without substantial loss of fluid, which comprises dividing a cross into two parts by cutting along one of its axes, placing the two parts in juxtaposition about the conduit whereby the conduit extends through aligned openings of the cross, securing a second conduit and an enclosed drilling apparatus respectively to the other aligned opening of the cross and drilling through the conduit in a direction which is substantially axial with the respect to the second conduit, thereby establishing communication between the two conduits.

TIMOTHY A. LARRY.
EARL E. CLINE.